(12) United States Patent
Li et al.

(10) Patent No.: US 9,864,418 B2
(45) Date of Patent: Jan. 9, 2018

(54) RISER CARD

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventors: Dao-Wei Li, Wuhan (CN); Chun-Sheng Chen, New Taipei (TW)

(73) Assignees: HONG FU JIN PRECISION INDUSTRY (WuHan) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 197 days.

(21) Appl. No.: 14/734,803

(22) Filed: Jun. 9, 2015

(65) Prior Publication Data
US 2016/0187940 A1    Jun. 30, 2016

(30) Foreign Application Priority Data
Dec. 26, 2014  (CN) .......................... 2014 1 0824338

(51) Int. Cl.
G06F 1/18      (2006.01)
G06F 1/26      (2006.01)

(52) U.S. Cl.
CPC .............. G06F 1/186 (2013.01); G06F 1/185 (2013.01); G06F 1/26 (2013.01)

(58) Field of Classification Search
CPC ....................................... G06F 1/186
See application file for complete search history.

(56) References Cited

U.S. PATENT DOCUMENTS

| | | | |
|---|---|---|---|
| 6,185,520 B1* | 2/2001 | Brown | G06F 13/4022 703/24 |
| 8,199,515 B2* | 6/2012 | Bandholz | G06F 1/185 257/686 |
| 2003/0016048 A1* | 1/2003 | Dongowski | G06F 1/26 324/764.01 |
| 2012/0039049 A1* | 2/2012 | Mukouyama | G06F 1/26 361/748 |

* cited by examiner

Primary Examiner — Jared Fureman
Assistant Examiner — James Evans
(74) Attorney, Agent, or Firm — ScienBiziP, P.C.

(57) ABSTRACT

A riser card includes a main body and an inserting portion. The main body includes a lower portion and defines a power supply interface. The inserting portion is coupled to the lower portion of the main body. The inserting portion can be inserted in and coupled to different expansion slots. The power supply interface can be coupled to an external power source to supply power to the riser card.

18 Claims, 2 Drawing Sheets

RISER CARD

FIELD

The subject matter herein generally relates to riser cards.

BACKGROUND

A riser card may be used to convert a first interface to a second interface.

BRIEF DESCRIPTION OF THE DRAWINGS

Implementations of the present technology will now be described, by way of example only, with reference to the attached figures.

DETAILED DESCRIPTION

Figure 1:
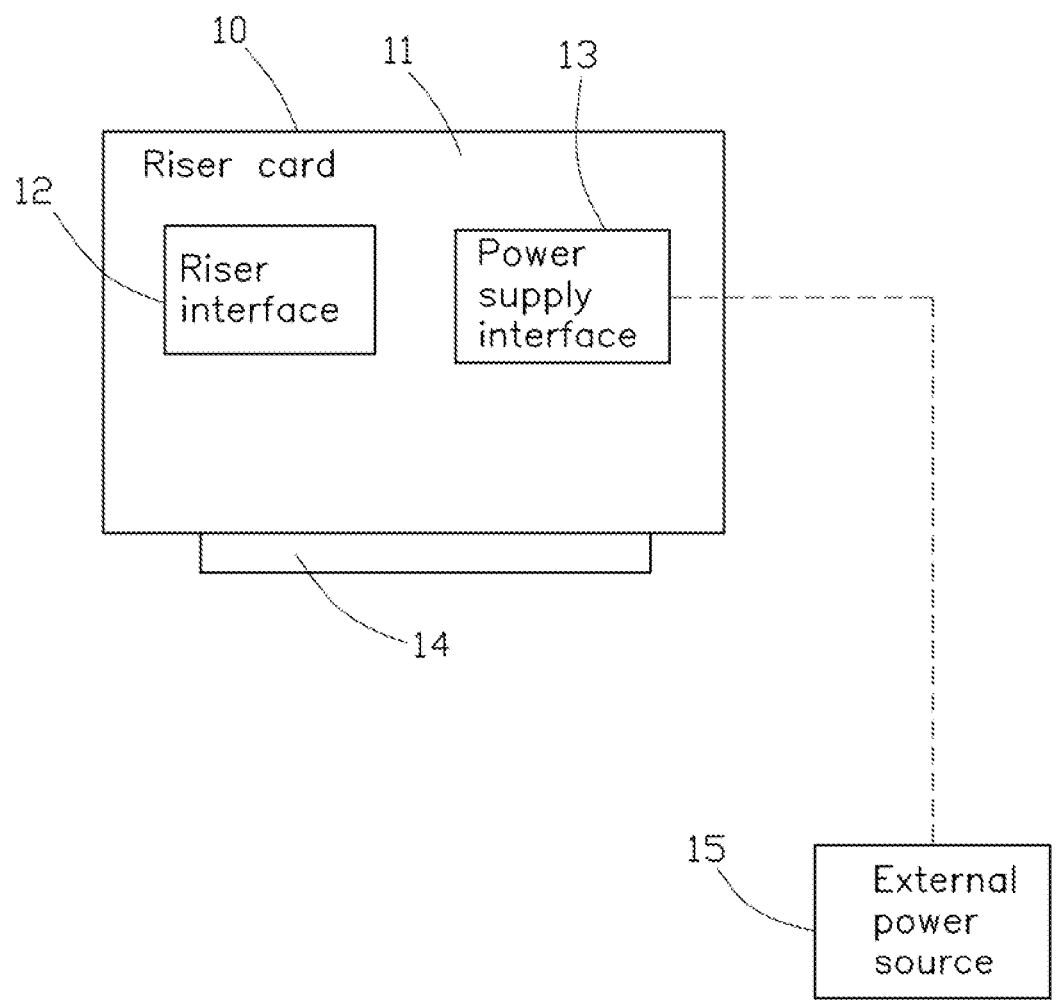
FIG. 1 is a block diagram of one embodiment of a riser card.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

The present disclosure is described in relation to a riser card to convert different interfaces.

Figure 2:
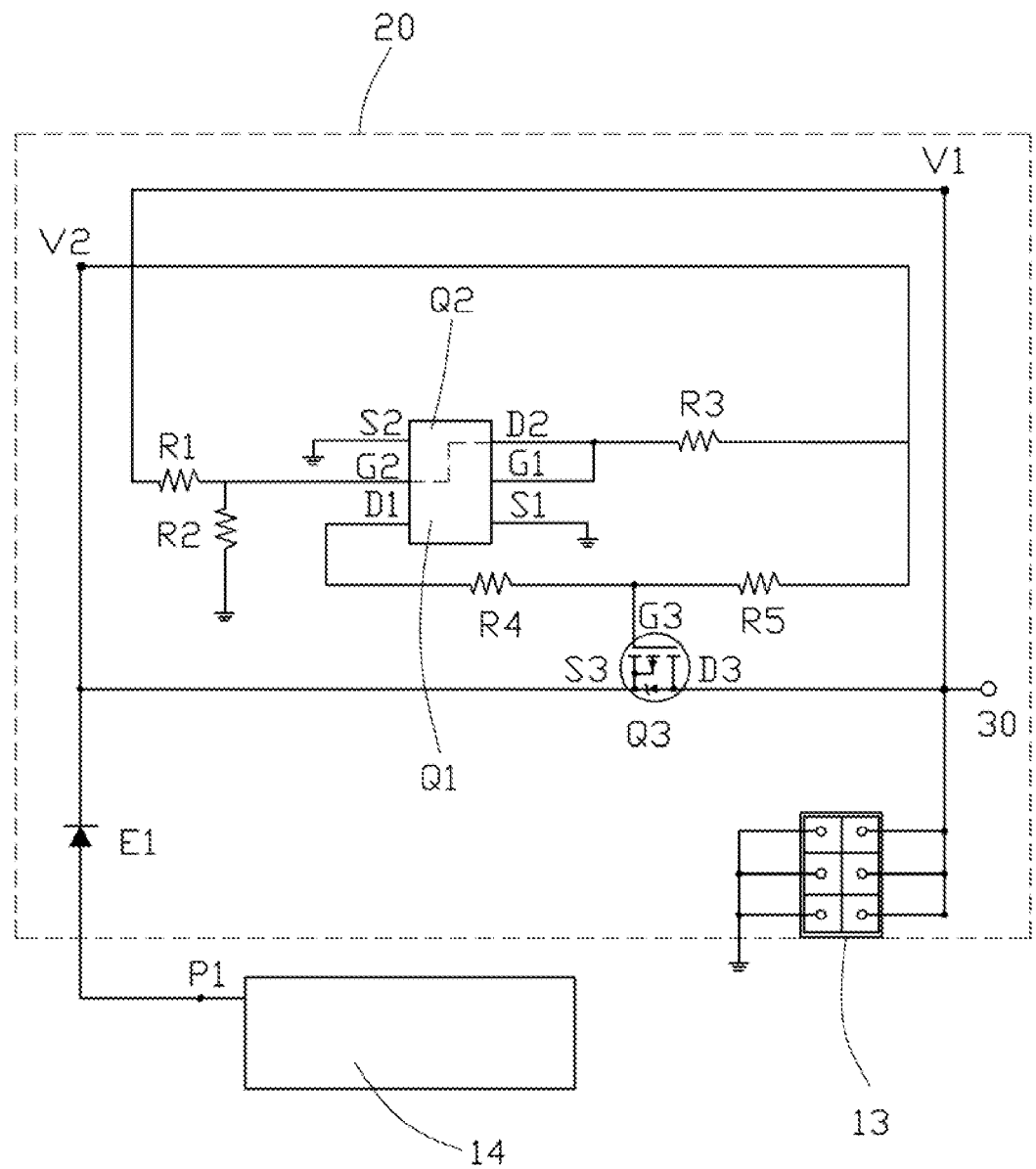
FIG. 2 is a circuit diagram of a power supply circuit of the riser card of FIG. 1.

FIGS. 1 and 2 illustrate an embodiment of a riser card 10. The riser card 10 comprises a main body 11, an inserting portion 14 coupled to a lower portion of the main body 11, and a power supply circuit 20. The power supply circuit 20 comprises a power supply interface 13. The main body 11 defines a riser interface 12. The power supply interface 13 is defined in the main body 11. The inserting portion 14 can be inserted in and coupled to different expansion slots, such as peripheral component interconnect express (PCI-Express) X1 slots, PCI-Express X4 slots, PCI-Express X8 slots or PCI-Express X16 slots. The power supply interface 13 can be coupled to an external power source 15. In one embodiment, the riser interface 12 is a FIREWIRE interface, thereby enabling the PCI-Express interfaces to be converted to FIREWIRE interfaces, such as PCI-Express X1 interfaces, PCI-Express X4 interfaces, PCI-Express X8 interfaces or PCI-Express X16 interfaces. The riser interface 12 can be other interfaces and the inserting portion 14 of the riser card 10 can be on other interfaces, thereby enabling different interfaces to be converted conveniently.

FIG. 2 illustrates that the power supply circuit 20 comprises a first field effect transistor (FET) Q1, a second FET Q2, a third FET Q3, a diode E1, a first resistor R1, a second resistor R2, a third resistor R3, a fourth resistor R4, and a fifth resistor R5. In one embodiment, each of the first FET Q1 and the second FET Q2 is an n-channel FET, and the third FET Q3 is a p-channel FET.

When the external power source 15 is connected to the power supply interface 13, the power supply interface 13 provides a first voltage V1. When the inserting portion 14 of the riser card 10 is inserted into the PCI-Express, a power supply pin P1 of the inserting portion 14 outputs a second voltage V2 via the diode E1. The second voltage V2 outputs to the gate terminal S3 of the third FET Q3. The power supply interface 13 is coupled to the drain terminal D3 of the third FET Q3. The drain terminal D3 of the third FET Q3 is further coupled to a power supply terminal 30. The power supply terminal 30 is configured to supply power to the riser interface 12. The gate terminal G1 of the first FET Q1 is coupled to the second voltage V2 via the resistor R3 and is coupled to the drain terminal D2 of the second FET Q2. The source terminal S1 of the first FET Q1 is grounded. The source terminal S2 of the second FET Q2 is grounded. The gate terminal G2 of the second FET Q2 is coupled to the power supply interface 13 via the resistor R1 and is grounded via the resistor R2. The drain terminal D1 of the first FET Q1 is coupled to the gate terminal G3 of the third FET Q3 via resistor R4. The gate terminal G3 of the third FET Q3 is coupled to the second voltage V2 via the resistor R5.

When the inserting portion 14 of the riser card 10 is inserted into a first slot (such as PCI-Express X1 slots) which cannot supply enough power to the riser interface 12, the external power source 15 is coupled to the power supply interface 13 to provide the first voltage V1. The first voltage V1 is sent to the gate terminal G2 of the second FET Q2, thus the drain terminal D2 of the second FET Q2 and the source terminal S2 of the second FET Q2 are switched on. The first FET Q1 is switched off. The second voltage V2 is sent to the gate terminal G3 of the third FET Q3. The third FET Q3 is switched off. The second voltage V2 from the inserting portion 14 is not sent to the power supply terminal 30. The first voltage V1 is sent to the power supply terminal 30 to supply power to the riser interface 12.

When the inserting portion 14 of the riser card 10 is inserted into a second slot (such as PCI-Express X1 slots) which can supply enough power to the riser interface 12, the external power source 15 is disconnected from the power supply interface 13 not providing the first voltage V1. The second FET Q2 is switched off. The first FET Q1 is switched on. The third FET Q3 is switched on. The second voltage V2 from the inserting portion 14 is sent to the power supply terminal 30 via the third FET Q3 to supply power to the riser interface 12.

It is to be understood that even though numerous characteristics and advantages have been set forth in the foregoing description of embodiments, together with details of the structures and functions of the embodiments, the disclosure is illustrative only and changes may be made in detail, including in the matters of shape, size, and arrangement of parts within the principles of the disclosure to the full extent indicated by the broad general meaning of the terms in which the appended claims are expressed.

What is claimed is:

1. A riser card comprising:
a main body comprising a lower portion;
a power supply circuit comprising:
  a power supply interface;
  a first field effect transistor (FET); and
  a second FET; and
an inserting portion coupled to the lower portion of the main body;
wherein the inserting portion can be inserted in and coupled to different expansion slots;
wherein the power supply interface is coupled to a gate terminal of the second FET, a power supply pin of the inserting portion is coupled to a drain terminal of the second FET, a source terminal of the second FET is grounded, and a gate terminal of the first FET is coupled to the drain terminal of the second FET; and
wherein the power supply interface can be coupled to an external power source to supply power to the riser card.

2. The riser card of claim 1, the second FET is configured to be switched on after the power supply interface is connected to the external power source, the first FET is configured to be switched off after the second FET is switched on, the second FET is configured to be switched off after the power supply interface is disconnected from the external power source, and the first FET is configured to be switched on after the second FET is switched off.

3. The riser card of claim 1, wherein the first FET is an n-channel FET.

4. The riser card of claim 1, wherein the power supply circuit further comprises a third FET, the power supply interface is coupled to a drain terminal of the third FET, the power supply pin of the inserting portion is coupled to a source terminal of the third FET, the drain terminal of the third FET is configured to be coupled to a power supply terminal, and a gate terminal of the third FET is coupled to the drain terminal of the first FET.

5. The riser card of claim 4, wherein the third FET is a p-channel FET.

6. The riser card of claim 4, wherein the gate terminal of the third FET is coupled to the power supply pin of the inserting portion.

7. The riser card of claim 4, wherein the power supply pin of the inserting portion is coupled to a source terminal of the third FET via a diode.

8. The riser card of claim 1, wherein the main body further defines a riser interface and the riser interface is a FIREWIRE interface.

9. The riser card of claim 8, wherein the inserting portion can be inserted into a peripheral component interconnect express (PCI-Express) X1 slot.

10. A riser card comprising:
a main body comprising a lower portion;
an inserting portion coupled to the lower portion of the main body; and
a power supply circuit comprising:
  a power supply interface;
  a first field effect transistor (FET); and
  a second FET coupled to the power supply interface;
wherein the power supply interface is defined in the main body;
wherein the inserting portion can be inserted in and coupled to different expansion slots;
wherein the power supply interface can be coupled to an external power source to supply power to the riser card;
wherein the first FET is coupled to the second FET;
wherein the first FET is an n-channel FET; and
wherein the power supply interface is coupled to a gate terminal of the second FET, a power supply pin of the inserting portion is coupled to a drain terminal of the second FET, a source terminal of the second FET is grounded, a gate terminal of the first FET is coupled to a drain terminal of the second FET.

11. The riser card of claim 10, wherein the second FET is an n-channel FET.

12. The riser card of claim 10, wherein the power supply circuit further comprises a third FET, the power supply interface is coupled to a drain terminal of the third FET, the power supply pin of the inserting portion is coupled to a source terminal of the third FET, the drain terminal of the third FET is coupled to a power supply terminal, a gate terminal of the third FET is coupled to the drain terminal of the first FET.

13. The riser card of claim 12, wherein the third FET is switched off after the power supply interface is coupled to the external power source, thereby enabling the external power source to supply power to the power supply terminal, and the third FET is switched on after the power supply interface is disconnected from to the external power source, thereby enabling the power supply pin of the inserting portion to supply power to the power supply terminal.

14. The riser card of claim 12, wherein the third FET is a p-channel FET.

15. The riser card of claim 12, wherein the gate terminal of the third FET is coupled to the power supply pin of the inserting portion.

16. The riser card of claim 12, wherein the power supply pin of the inserting portion is coupled to a source terminal of the third FET via a diode.

17. The riser card of claim 10, wherein the main body further defines a riser interface and the riser interface is a FIREWIRE interface.

18. The riser card of claim 17, wherein the inserting portion can be inserted into a PCI-Express X8 slot or a peripheral component interconnect express (PCI-Express) X16 slot.

* * * * *